(12) United States Patent
Müller et al.

(10) Patent No.: US 8,573,323 B2
(45) Date of Patent: Nov. 5, 2013

(54) HAND-HELD POWER TOOL

(75) Inventors: Matthias Müller, Remshalden (DE);
Heiko Roβkamp, Adelberg (DE);
Gernot Liebhard, Waiblingen (DE);
Michael Renz, Stuttgart (DE)

(73) Assignee: Andreas Stihl AG & Co. KG,
Waiblingen (DE)

( * ) Notice: Subject to any disclaimer, the term of this patent is extended or adjusted under 35 U.S.C. 154(b) by 329 days.

(21) Appl. No.: 13/074,079

(22) Filed: Mar. 29, 2011

(65) Prior Publication Data
US 2011/0241457 A1    Oct. 6, 2011

(30) Foreign Application Priority Data

Mar. 31, 2010  (DE) .................. 10 2010 013 756

(51) Int. Cl.
*H02K 7/14*    (2006.01)
(52) U.S. Cl.
USPC .............................. 173/217; 173/171; 173/75
(58) Field of Classification Search
USPC ............................................ 173/217, 171, 75
See application file for complete search history.

(56) References Cited

U.S. PATENT DOCUMENTS

| | | | |
|---|---|---|---|
| 3,034,376 A | | 5/1962 | Gonzales |
| 4,268,964 A | | 5/1981 | Moore |
| 4,352,243 A | | 10/1982 | Lombard |
| 5,595,531 A | * | 1/1997 | Niemela et al. ............... 451/357 |
| 5,807,169 A | * | 9/1998 | Martin et al. ................. 451/357 |
| 6,043,575 A | * | 3/2000 | Ghode et al. ..................... 310/52 |
| 7,094,011 B2 | * | 8/2006 | Kopras et al. ................. 409/137 |
| 7,909,942 B2 | * | 3/2011 | Wood ......................... 134/115 R |
| 7,959,415 B2 | * | 6/2011 | Schuetzle et al. ............. 417/273 |
| 8,052,345 B2 | * | 11/2011 | Byers et al. ...................... 403/50 |
| 8,187,391 B2 | * | 5/2012 | Wood ......................... 134/115 R |
| 8,226,454 B2 | * | 7/2012 | Chen ................................. 451/7 |
| 8,302,251 B2 | * | 11/2012 | Beskow et al. ................. 15/329 |
| 2003/0163924 A1 | * | 9/2003 | Hempe et al. .................... 30/388 |
| 2005/0044834 A1 | * | 3/2005 | Appleyard ..................... 56/12.7 |
| 2007/0294991 A1 | * | 12/2007 | Medina et al. ................. 56/11.9 |
| 2008/0042500 A1 | | 2/2008 | Horng et al. |
| 2008/0302551 A1 | * | 12/2008 | Komuro et al. ............... 173/217 |
| 2009/0179096 A1 | * | 7/2009 | Wood .............................. 241/38 |
| 2010/0083513 A1 | | 4/2010 | Pellenc |
| 2010/0252295 A1 | * | 10/2010 | Schroeder et al. ............ 173/217 |

FOREIGN PATENT DOCUMENTS

| | | |
|---|---|---|
| DE | 10 2004 032 789 A1 | 2/2006 |
| EP | 0 046 051 A1 | 2/1982 |
| GB | 1 578 906 | 11/1980 |
| JP | 06-062637 A | 3/2004 |
| WO | 2008/098428 A1 | 8/2008 |

\* cited by examiner

*Primary Examiner* — Brian D Nash
(74) *Attorney, Agent, or Firm* — Gudrun E. Huckett

(57) ABSTRACT

A hand-held power tool has a tool member and a motor drivingly connected to the tool member, wherein the motor is arranged in a motor housing. A battery for driving the tool member is provided. A guide shaft has arranged on its first end the battery and on its second end the motor housing and the tool member. A rotatably power output part arranged on the motor housing is drivingly connected to the motor. The power output part supports the tool member. Cooling air is sucked through the guide shaft into the motor housing. Between the power output part and the motor housing an annular air exit gap is formed through which the cooling air exits the motor housing. At least one guide vane that projects into the annular air exit gap is provided.

17 Claims, 5 Drawing Sheets

HAND-HELD POWER TOOL

BACKGROUND OF THE INVENTION

The invention relates to a hand-held power tool comprising a tool member that is driven by a motor, a battery for driving the tool member, and a guide shaft.

It is known to use in such hand-held power tools, for example, trimmers, pole pruners or the like, a battery as an energy supply of the electric motor. In known power tools, simple mechanically commutated brush-type motors are used. Such a power tool is disclosed, for example, in JP 06-062637 A.

SUMMARY OF THE INVENTION

It is an object of the present invention to provide a hand-head power tool with which the tendency of the motor housing to become soiled is minimal.

A further object of the present invention is to provide a hand-head power tool that is of a robust construction.

In accordance with the present invention, this is achieved in that the hand-held power tool, comprising a tool member driven by a motor, wherein the power tool comprises a battery for driving the tool member and comprises a guide shaft, wherein on the first end of the guide shaft the battery and on the second end a motor housing and the tool member are arranged, wherein on the motor housing a rotating power output part is arranged that supports the tool member and that is driven by the motor in rotation, wherein cooling air is sucked in through the guide shaft into the motor housing, is characterized in that between the power output part and the motor housing an annular air exit gap is formed through which the cooling air exits and in that at least one guide vane is provided that projects into the annular air exit gap.

The object is further achieved in that the hand-held power tool, comprising at least one tool member that is driven by a motor, wherein the power tool comprises a battery for driving the tool member and comprises a guide shaft, wherein on the first end of the guide shaft the battery and on the second end of the guide shaft the motor and the tool member are arranged, wherein the motor is arranged in a motor housing, is characterized in that the motor is elastically supported in such a way that the motor can tilt within the motor housing when transverse forces are introduced into or act on the tool member.

In operation of the hand-held power tool it must be prevented that dirt or contaminants can enter the motor housing. At the same time, it must be ensured that the cooling air that has been sucked into the motor housing can exit. For this purpose, it is provided that between the power output part and the motor housing an annular air exit gap is formed through which the cooling air exits and in that at least one guide vane is provided that projects into the annular air exit gap. The guide vane thus reduces the flow cross-section of the air exit gap. Advantageously, the guide vane is arranged on the power output part. Because of the rotation of the power output part, sufficiently large free (unobstructed) sections can be formed circumferentially between neighboring guide vanes through which the air can exit. As a result of the rotation of the guide vane(s), the penetration of foreign matter into the motor housing is not possible or only possible with difficulty through the section between neighboring guide vanes so that the motor housing can be kept substantially free of any dirt or contaminants. The cooling air that is blown out through the air exit gap blows dirt particles away from the air exit gap and prevents in this way entry of dirt particles into the motor housing.

Advantageously, several guide vanes are provided. The guide vanes are in particular approximately radially oriented. An advantageous design results when the air exit gap is formed on an annular channel of the power output part, the annular channel being substantially U-shaped in cross-section. A housing rim of the motor housing projects into this U-shaped annular channel. In this way, between the housing rim and the annular channel a labyrinth-type air guiding path with several deflections is formed that further makes difficult penetration of dirt or contaminants into the motor housing. The guide vane is in particular arranged in the annular channel. The housing rim projects up to a location near the guide vane. The spacing between housing rim and guide vane is advantageously selected such that contact between housing rim and guide vane is prevented in usual operation of the power tool. The spacing or distance between housing rim and guide vane is advantageously selected to be as small as possible, taking into consideration the manufacturing tolerances. The spacing is in particular approximately 0.5 mm up to approximately 2 mm.

The housing rim may extend in axial direction of the motor shaft into the annular channel. However, it may also be provided that the annular channel in circumferential direction is located outside or inside the housing rim and that the housing rim projects radially relative to the longitudinal axis of the motor shaft to the exterior or to the interior. It may also be provided that the housing rim, in lateral direction relative to the guide vane, has relative to the annular channel only a very small spacing, for example, a spacing of approximately 0.5 mm up to approximately 2 mm. In this way, an even further improved sealing action with regard to dirt or contaminants is provided.

Advantageously, the power tool has a cutting head that comprises a rotating tool member, for example, a blade or a trimmer line, wherein the annular channel is formed on a disk that is fixedly connected to the cutting head. In this way, a simple configuration is provided. The disk is advantageously comprised of plastic material, in particular of a fiberglass-reinforced polyamide. The material of the disk and the motor housing are advantageously matched to each other in such a way that upon contact of housing rim and disk no fusing of the two components with each other can take place.

By using an electronically commutated brushless motor, the servicing expenditure for the motor is reduced because no wear-prone brushes are required. Such an electronically commutated motor is operated with rotating field with at least three phases. For generating the rotating field of at least three phases from the direct current that is supplied by the battery, an electronic control unit is provided. In order to keep exitance of the electromagnetic radiation as small as possible, it is provided that the electronic control unit is arranged at the second end of the guide shaft, i.e., spatially directly adjacent to the motor. In this way, electric lines that connect the control unit to the motor and through which the rotating field of at least three phases is made available, are very short so that the electromagnetic exitance can be kept minimal. The lines or cables that are passed through the guide shaft from the battery to the electronic control unit supply pulsed direct current. The arrangement of the electronic control unit in the motor housing is in particular possible when, by means of a suitable air guiding path and sealing action of the motor housing, the motor housing is substantially kept free of any dirt or contaminants.

Advantageously, the motor and the electronic control unit are arranged in the motor housing. In order to provide excellent cooling action of the electronic control unit, it is provided that in the motor housing at least one flow guiding rib is provided that deflects the cooling air exiting from the guide shaft in the direction toward the electronic control unit. Advantageously, the electronic control unit in the regular or usual working position of the power tool is arranged below the mouth (opening) of the guide shaft. With this arrangement an advantageous deflection and swirling action of the cooling air flow are provided. At the same time, the motor housing can be configured to be compact and in the front area where the tool member is arranged can be of a small height. For conveying the cooling air advantageously fan blades are arranged in the motor housing that are driven in rotation and suck cooling air into the motor housing through the guide shaft that is hollow. By sucking in the cooling air through the guide shaft, it is ensured that substantially clean air from the area of the first end of the guide shaft is sucked into the motor housing.

A simple configuration results when the motor is embodied as an external rotor motor wherein at least one fan blade for conveying the cooling air is arranged on the rotor of the motor. A separate fan wheel for conveying the cooling air can be eliminated by configuring the motor as an external rotor motor so that the number of required components is reduced. It may also be provided that a separate fan wheel is fixedly connected to the rotor, for example, is connected with positive fit on the rotor. In order to prevent soiling of the electronic control unit in operation as much as possible, it is provided that the motor housing is divided by a wall into a pressure side and a suction side wherein the fan blade is arranged within the pressure side and the electronic control unit is arranged within the suction side. The suction side is advantageously significantly larger than the pressure side. In this way, the suction side provides a convection space for the cooling air which provides for an effective cooling action.

A simple configuration is achieved when the cooling air is sucked into the guide shaft through a gap that is formed at a receiving opening for the battery between the battery and the battery housing. Additional air intake openings in the battery housing are thus not required. Advantageously, on the battery housing at least one handle is arranged for guiding the power tool. An ergonomic handling is provided when the power tool has at least one loop handle that in particular is secured adjacent to the battery housing on the guide shaft. The loop handle is advantageously mirror-symmetrical to a mirror plane that divides the guide shaft in longitudinal direction so that the power tool can be operated by right-handed people as well as left-handed people. An especially ergonomic configuration of the loop handle results when the loop handle, when viewed in the direction from the first end to the second end of the guide shaft and in the usual or regular working position of the power tool, extend upwardly and is curved. The center of the bending radius of the loop handle is located advantageously above the battery housing and on the side of the loop handle that is facing the battery housing.

In known internal rotor motors the motor shaft is supported in the area of its ends. In case of an external rotor motors, this is not possible as a result of the tool member being arranged at one end of the motor shaft. Since the motor shaft can be supported only at the upper end and its central area, in operation of the power tool very high bending moments acting on the motor shaft may result.

In order to prevent in operation of the power tool an excessive loading of the motor shaft by bending moments, it is provided that the motor as a whole is elastically supported. In this way, when transverse loads occur, the motor can yield and tilt so that the entire bending moment is not introduced into the motor shaft. This can be achieved in a simple way in that the fastening flange of the motor is inserted between housing ribs of the motor housing and in this way is secured in the motor housing. The housing ribs are comprised in particular of plastic material and therefore have themselves a sufficient elasticity. The plastic material is advantageously a substantially shape-stable plastic material and not an elastomer. In this way, a sufficient stability in operation of the power tool can be achieved. Alternatively, it can also be provided that the motor is supported by means of a separate component with its own defined elasticity, for example, a piece of sheet metal, in the motor housing. In order to prevent excessive movement of the motor shaft, it is provided that the power output part upon loading transverse to the longitudinal direction of the motor shaft is supported on a housing rim of the motor housing. The housing rim delimits in this connection in particular an air exit gap for the cooling air that is formed between the rotating power output part and the motor housing. High stability or strength results when the motor housing is made of plastic material, in particular of ABS (acrylonitrile butadiene styrene). In this connection, it can also be provided that the stop between the housing rim and the guide vanes is formed at the air exit gap.

DESCRIPTION OF THE PREFERRED EMBODIMENTS

Figure 1:
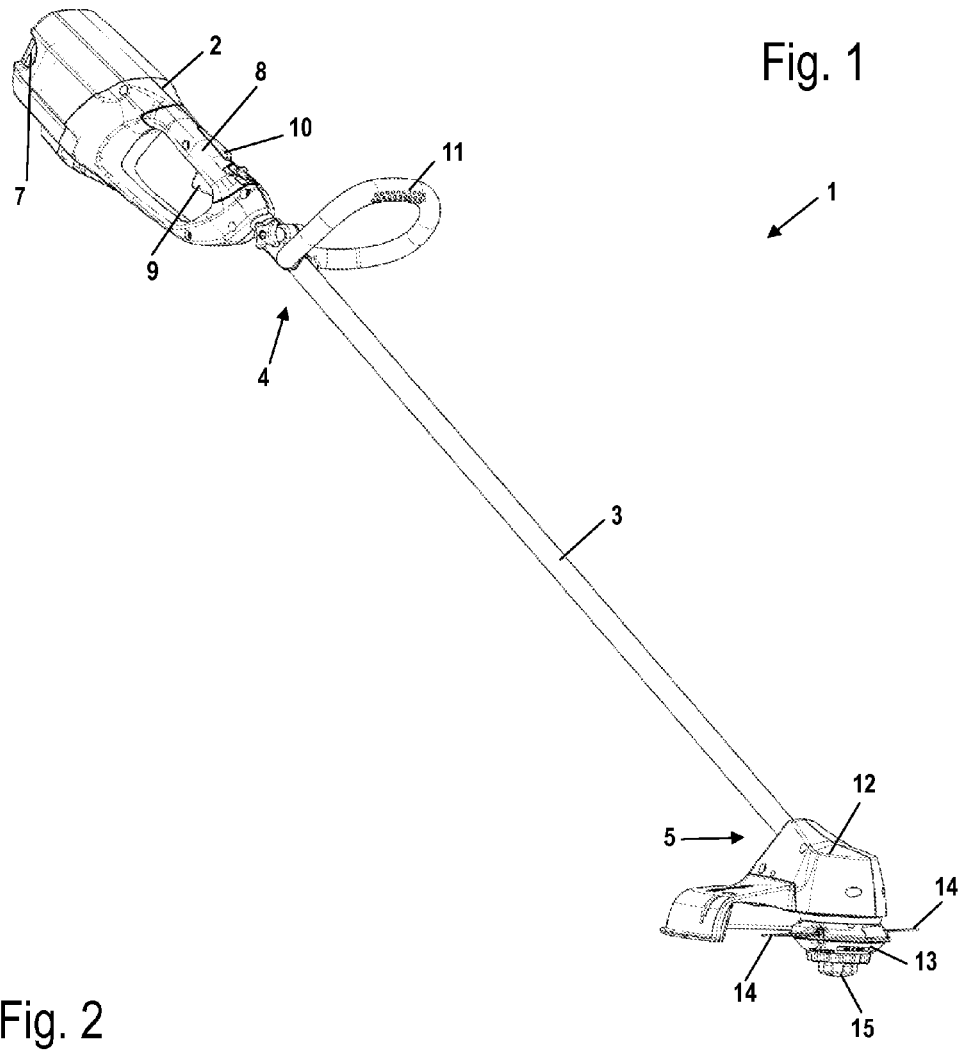
FIG. 1 is a perspective view of a trimmer.

FIG. 1 shows an embodiment of a hand-held power tool in the form of a trimmer 1. The trimmer 1 has a battery housing 2 in which a battery 6 is arranged (see FIG. 2). The battery 6 is secured in the battery housing 2 by means of a locking device 7 shown in FIG. 1. As illustrated in FIG. 1, on the battery housing 2 a handle 8 is formed on which a throttle lever 9 and throttle lever lock 10 for operating the power tool are arranged. The battery housing 2 is connected by means of a hollow guide shaft 3 with motor housing 12. The battery housing 2 is arranged on the first end 4 of the guide shaft 3 and the motor housing 12 on the second end 5 of the guide shaft 3. On the motor housing 12 a trimmer line cutting head 13 is arranged that is driven in rotation. The trimmer line cutting head 13 has two trimmer lines 14 that function as a cutting tool member. For readjusting the trimmer lines 14 on the bottom side of the mower head 13 an actuator button 15 is provided. Adjacent to the battery housing 2, a loop handle 11 is secured on guide shaft 3.

Figure 2:
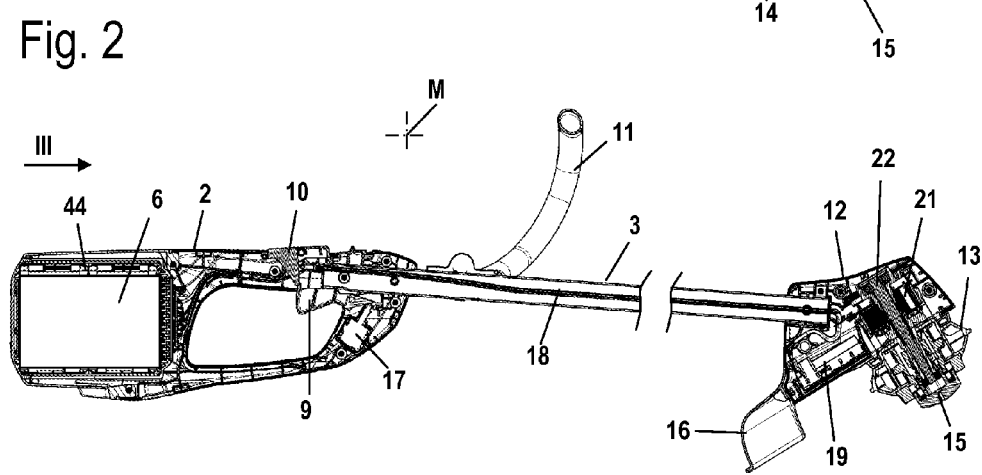
FIG. 2 is a section of the trimmer of FIG. 1.

As shown in the section illustration of FIG. 2, the battery 6 is arranged in a receiving opening 44 that is formed in the battery housing 2. In the motor housing 12 a motor 21 is arranged that drives the trimmer line cutting head 13. The motor 21 has a motor shaft 22. The motor 21 is embodied as an electronically commutated brushless motor. The motor 21 is an external rotor motor. For operating the motor 21, an electronic control unit 19 is provided that converts the direct current supplied by the battery 6 into a rotating field of at least three phases. The control unit 19 is positioned adjacent to the motor 21 in the motor housing 12. On the motor housing 12 a protective shield 16 is attached. As shown in FIG. 2, the throttle lever 9 acts on a switch 17. The battery 6 is connected to the electronic control unit 19 by means of a connecting line 18 that passes through the guide shaft 3 and through which the direct current is transmitted from the battery 6 to the control unit 19.

Figure 3:
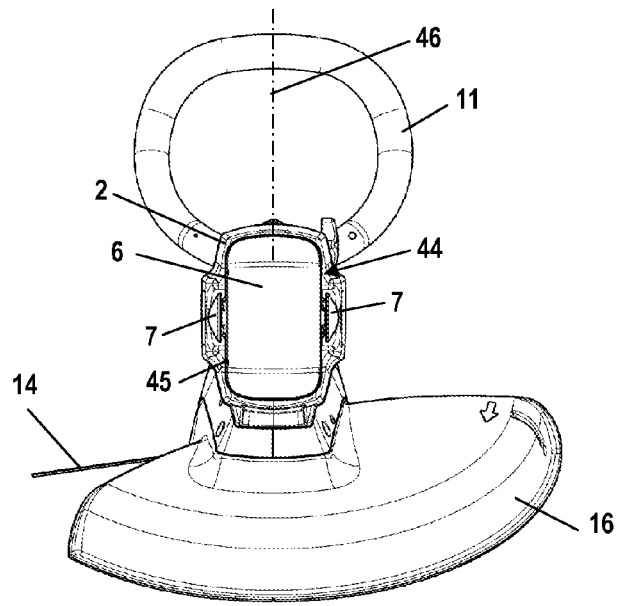
FIG. 3 is a side view in the direction of arrow III in FIG. 2.

FIG. 3 shows the arrangement of the battery 6, embodied in particular as a battery pack, in the receiving opening 44. As illustrated in FIG. 3, between the battery pack 6 and the receiving opening 44 a circumferentially extending gap 45 is formed through which the cooling air is sucked into the battery housing 2 and from there through the guide shaft 3 into the motor housing 12. As also shown in FIG. 3, the loop handle 11 is symmetrical to a mirror plane 46 that divides the guide shaft 3 in longitudinal direction. As shown in FIG. 2, the loop handle 11 extends from the handle 8 upwardly and in a direction toward the motor housing 12 and is curved. The center M of the bending radius of the loop handle 11, when viewed perpendicularly to the mirror plane 46, is positioned above the guide shaft 3 or the front area of the battery housing 2 on the side of the loop handle 11 that is facing the battery housing 2.

Figure 4:
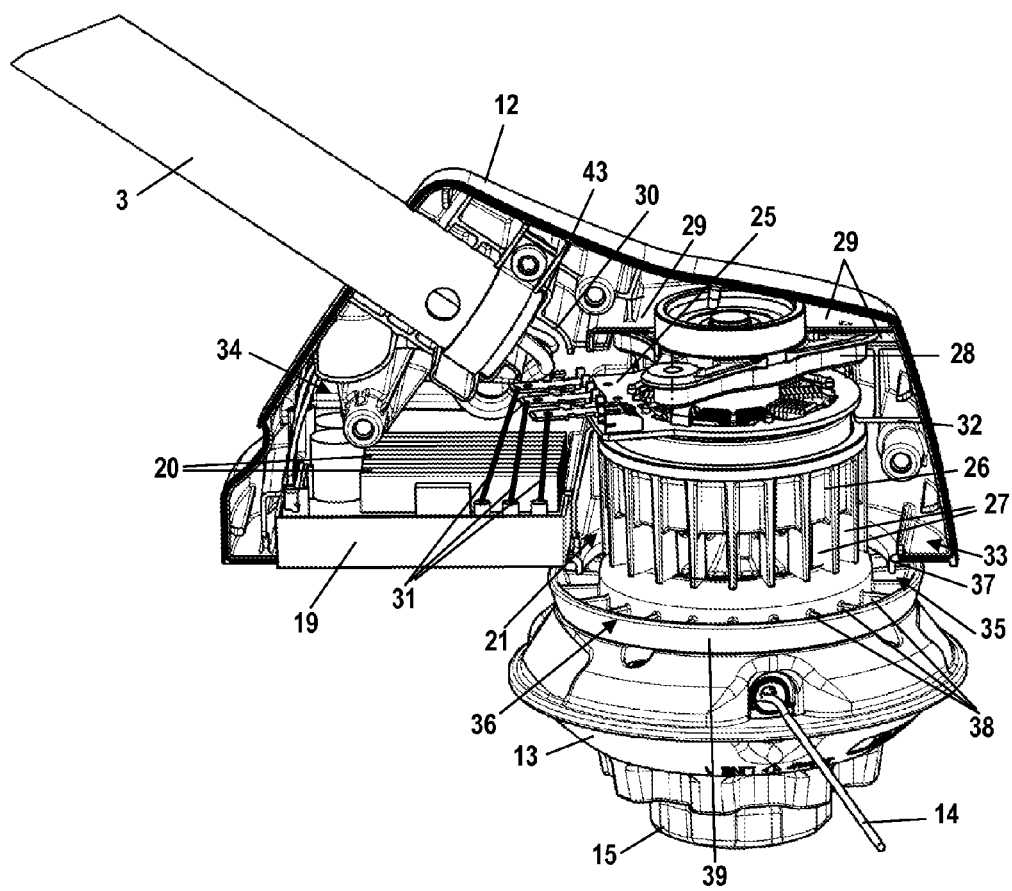
FIG. 4 is a perspective and partially sectioned view of the motor housing and cutting head of the trimmer.

FIG. 4 shows the construction of the motor housing 12 in detail. The guide shaft 3 opens with its mouth (opening) 43 into the motor housing 12. Adjacent to the mouth (opening) 43 there are flow guiding ribs 30 formed integrally on the motor housing 12 that deflect the cooling air exiting from the guide shaft 3 into the motor housing 12 in downward direction. In the usual operating position of the trimmer 1, as illustrated in FIG. 4, the electronic control unit 19 is arranged below the mouth (opening) 43. A plurality of cooling ribs 20 are formed on the electronic control unit 19 that advantageously are metallic in order to enable an excellent heat dissipation. The electronic control unit 19 is arranged at the bottom of the motor housing 12 adjacent to the motor 21. The motor housing 12 is divided by a wall 32 into a pressure side 33 and a suction side 34. The wall 32 is embodied as a rib in the motor housing 12 and is integrally formed on the motor housing 12. The volume of the suction side 34 is significantly larger than that of the pressure side 33. The guide shaft 3 opens at the suction side 34. At the suction side 34 there is also the control unit 19 as well as a circuit board 25 of the motor 21. The circuit board 25 is connected to the electronic control unit 19 by means of control lines or cables 31 illustrated schematically in FIG. 4. The motor 21 has a fastening flange 28 that is also arranged on the suction side 34. The fastening flange 28 is inserted between parallel extending neighboring housing ribs 29 of the motor housing 12 and is secured between them. The fastening flange 28 is not screwed onto the motor housing 12. The motor housing 12 is comprised of plastic material, in particular ABS. Therefore, the housing ribs 29 are slightly or somewhat elastic. In this way, an elastic support of the motor 21 is provided. The fastening flange 28 is supported between the housing ribs 29 in axial direction of the motor shaft 22 and in circumferential direction.

The motor 21 is embodied as an external rotor motor. The motor 21 has a rotor 26 that is arranged on the pressure side 33 and supports fan blades 27 that suck in the cooling air from the battery housing 2.

The motor housing 12 has a housing rim 37 that delimits a through opening for the rotor 26 and the components that are fixedly connected to the motor 26. Between rotor 26 and trimmer line cutting head 13, a disk 39 is arranged that is also fixedly connected to the rotor 26 and to the cutting head 13.

Figure 6:
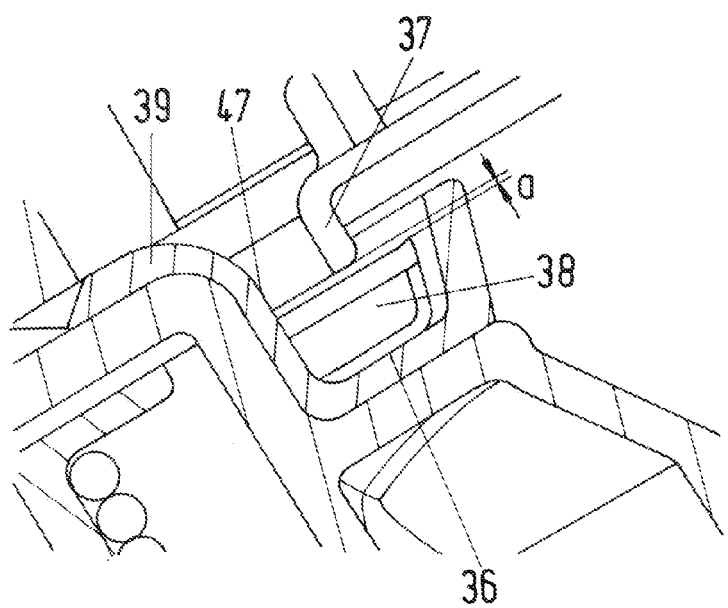
FIG. 6 is a detail view of the air exit gap of the motor housing.

The disk 39 is comprised of plastic material, in particular glass fiber reinforced polyamide. The disk 39 forms an annular channel 36 which is shown in detail in FIG. 6. A plurality of guide vanes 38 are arranged within the annular channel 36 and, in circumferential direction, are spaced apart from each other and are each radially oriented. The housing rim 37 extends in axial direction of the motor shaft 22 and projects to a position in close proximity to the top edge of the guide vanes 38. Between the guide vanes 38 and the housing rim 37 a spacing a is formed that is illustrated in FIG. 6 and that advantageously is selected to be as small as possible. The spacing a is selected such that, for the usual range of manufacturing tolerances, no contact between the housing rim 37 and the guide vanes 38 exists. The spacing a is advantageously from approximately 0.5 mm up to approximately 2 mm. As a result of the deflection of the exiting cooling air in the annular channel 36 a labyrinth-type sealing action of the annular air exit gap 35 is achieved.

As shown in FIG. 4, the pressure side 33 encompasses substantially the space that surrounds the rotor 26.

Figure 5:
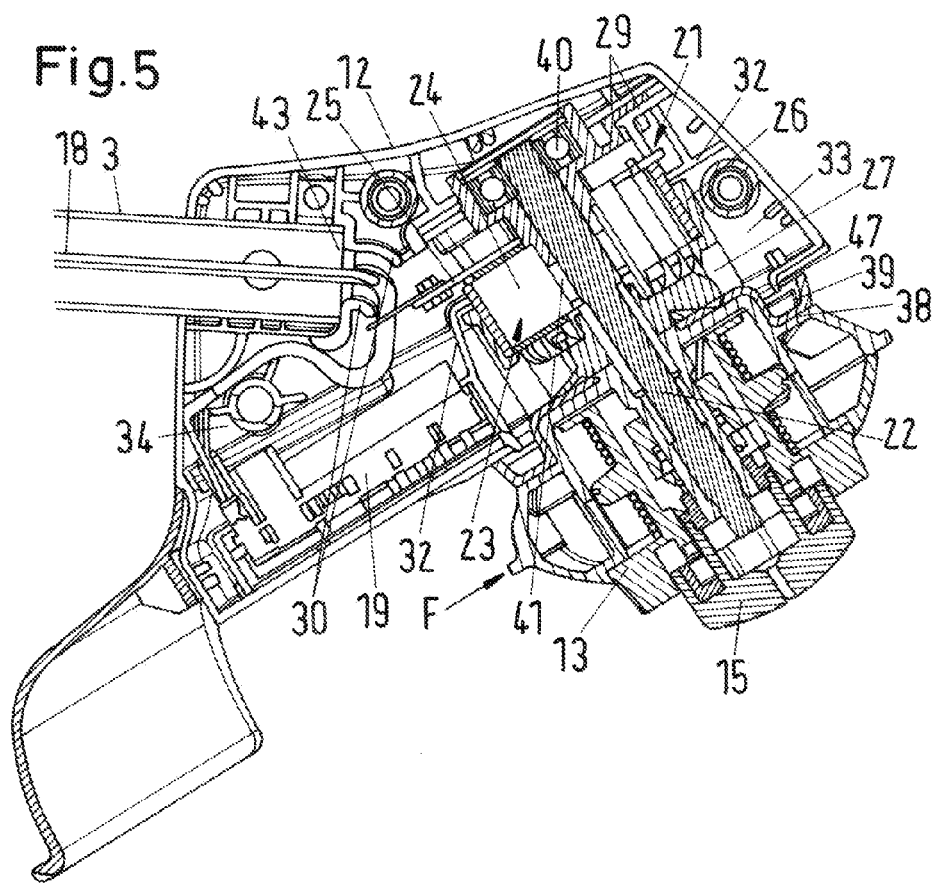
FIG. 5 is a section of the motor housing and the cutting head of the trimmer.

FIG. 5 shows the configuration of the motor 21 and its support in detail. The motor shaft 22 is supported in a first bearing 40 in the area of the fastening flange 28. A second bearing 41 is arranged in a central area of the motor shaft 22 in the interior of the stator 23. In this way, the motor shaft 22 is supported only within its upper area. The stator 23 of the motor 21 comprises at least one field coil 24 that generates a magnetic field. The rotor 26 comprises radially outside of the stator 23 magnets that are acted on by the magnetic field generated by the at least one field coil 24 and therefore cause the rotor 26 to rotate. The motor shaft 22 rotates in operation of the motor with the rotor 26 and is connected fixedly to the cutting head 13 (power output part).

As a result of the elastic support of the motor 21 between the housing ribs 29, the motor can tilt when a transverse force F is acting on the cutting head 13 (power output part). In order to limit this tilting movement, on the disk 39 a stop 47 is provided that interacts with the housing rim 37 (FIGS. 4 and 6) and delimits the tilting movement of the motor 21 and of the cutting head 13 in this way. The angle about which the motor shaft 22 can tilt is advantageously approximately from 1 degree to approximately 5 degrees.

In order to further improve the labyrinth-type sealing action at the air exit gap 35, it may be provided that also the spacing between the housing rim 37 and the annular channel 36 in radial direction can be selected to be very small, for example, in accordance with the spacing a. In this way, the possible tilting movement of the motor can be limited. It may also be provided that the annular channel 36 opens in radial direction outwardly or inwardly and that the housing rim 37 extends in radial direction to the interior or to the exterior. In this case, it may be provided that the housing rim 37 with the guide vanes 38 forms a stop for the tilting movement of the motor 21.

The arrangement of the electronic control unit of an electronically commutated brushless motor directly adjacent to the motor at the second end 5 of guide shaft 3, the elastic support of the motor 21 between the housing ribs 29, and the configuration of the air exit gap with guide vanes 38 represent inventive concepts that are independent from each other that, however, supplement each other in advantageous ways.

Figure 7:
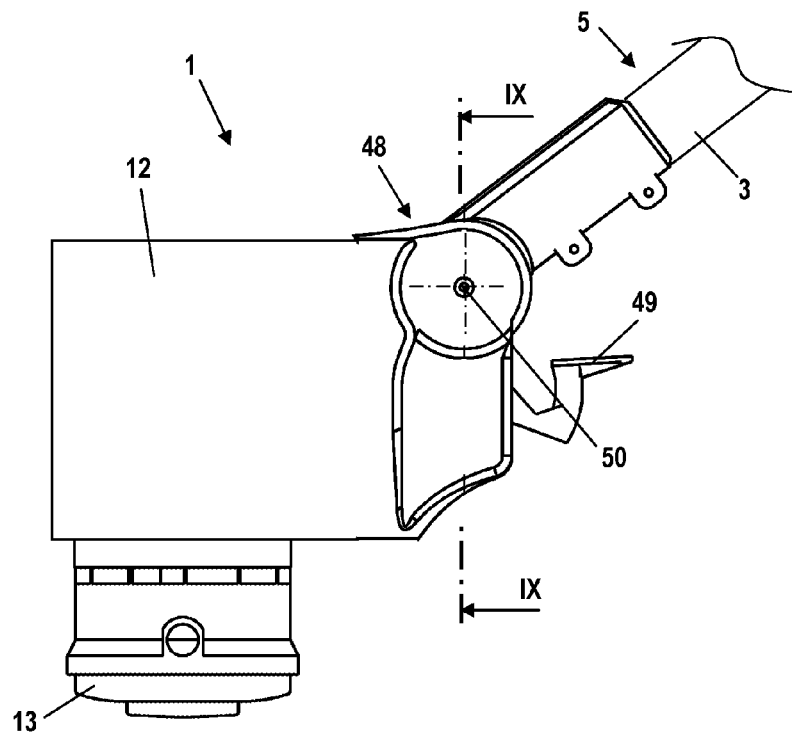
FIG. 7 is a schematic side view of an embodiment of a trimmer.

FIG. 7 shows an embodiment of a trimmer. The trimmer 1 illustrated in FIG. 7 has a motor housing 12 that is supported by a rotary joint 48 on the second end 5 of the guide shaft 3. The rotary joint 48 has an actuation lever 49 with which a locked position of the rotary joint 46 can be released or the position of the guide shaft 3 and the motor housing 12 relative to each other can be secured or locked. The motor housing 12 in this connection is supported rotatably about the pivot axis 50 on the guide shaft 3. Reference numerals in FIGS. 7 to 9 that are the same as in the preceding Figures indicate same elements.

Figure 8:
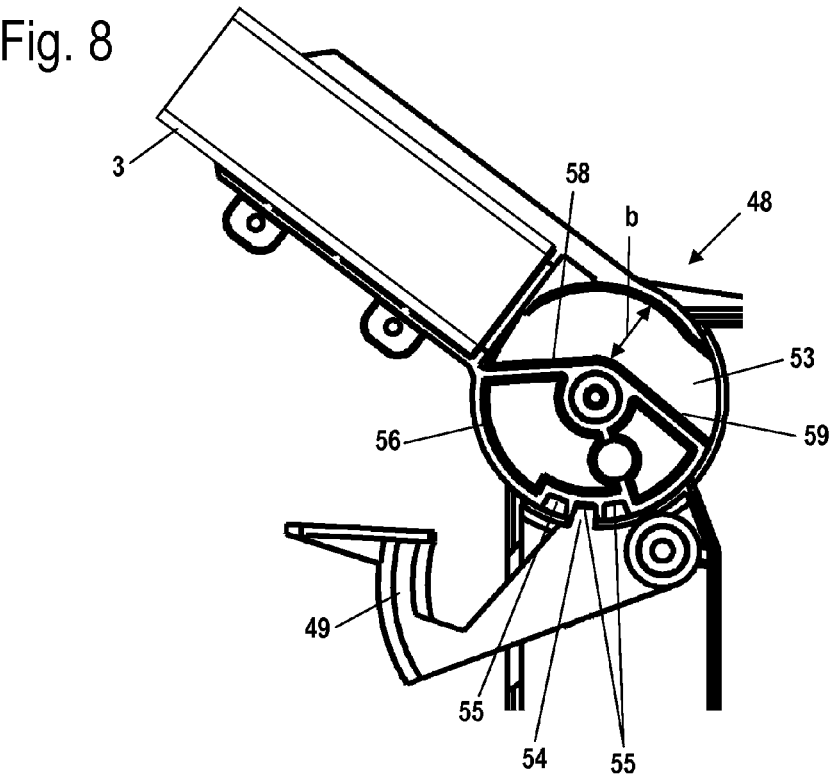
FIG. 8 is a section of the rotary joint of the trimmer.
Figure 9:
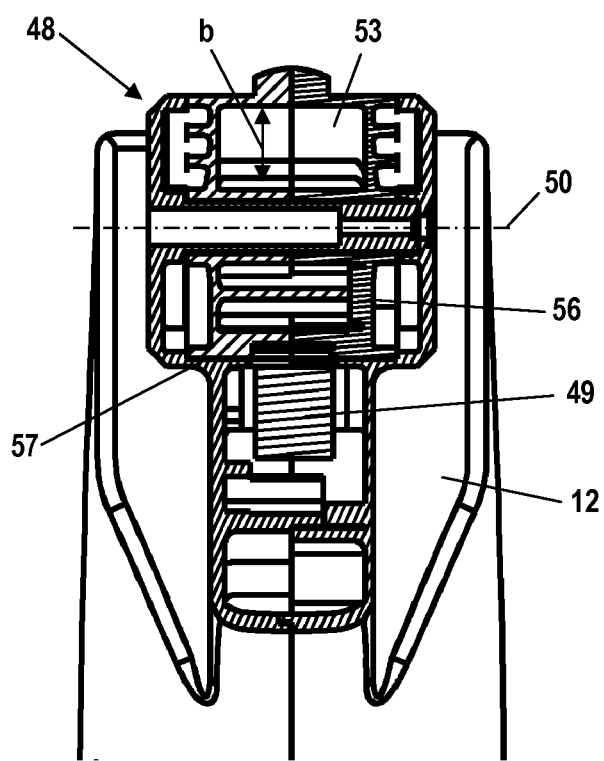
FIG. 9 is a section along the section line IX-IX of FIG. 7.

FIGS. 8 and 9 illustrate the configuration of the rotary joint 48 in detail. The rotary joint 48 has a barrel-shaped section 56 that is rotatably supported in a receptacle 57 of the motor housing 12. The receptacle 57 engages the barrel-shaped section 56 about more than half of its circumference. As shown in FIG. 8, in the barrel-shaped section 56 a passage 53 is formed that is delimited by two sidewalls 58 and 59 that extend at an angle relative to each other. The walls 58 and 59 are arranged relative to each other such that in any possible position of the guide shaft 3 the same smallest height b of the passage 53 is provided. The rotary joint 48 in this way provides a throttle location for the air that is passing through the guide shaft 3 into the motor housing 12 that is always of the same size independent of the position of the rotary joint 40.

As illustrated in FIG. 8, on the actuating lever 49 a locking nose 54 is formed. The barrel-shaped section 56 has several locking recesses 55 that can be engaged by the locking nose 54 in order to secure in the way the position of the guide shaft 3 relative to the motor housing 12. Advantageously, the connecting line 18 that supplies energy to the motor 21 is also guided through the passage 53 and the guide shaft 3. The air suction action is realized through the battery housing 2, the guide shaft 3, and the passage 53 of the rotary joint 48 into the motor housing 12.

The specification incorporates by reference the entire disclosure of German priority document 10 2010 013 756.1 having a filing date of Mar. 31, 2010.

While specific embodiments of the invention have been shown and described in detail to illustrate the inventive principles, it will be understood that the invention may be embodied otherwise without departing from such principles.

What is claimed is:

1. A hand-held power tool comprising:
   a tool member;
   a motor drivingly connected to said tool member;
   a motor housing in which said motor is arranged;
   a battery for driving said tool member;
   a guide shaft having a first end and an opposed second end;
   wherein on said first end said battery is arranged and on said second end said motor housing and said tool member are arranged;
   a power output part arranged on said motor housing and drivingly connected to said motor so as to rotate;
   wherein said power output part supports said tool member;
   wherein cooling air is sucked through said guide shaft into said motor housing;
   wherein between said power output part and said motor housing an annular air exit gap is formed through which the cooling air exits said motor housing;
   at least one guide vane that projects into said annular air exit gap.

2. The power tool according to claim 1, wherein said at least one guide vane is arranged on said power output part.

3. The power tool according to claim 1, wherein several of said at least one guide vanes are provided.

4. The power tool according to claim 3, wherein said guide vanes are oriented substantially radially.

5. The power tool according to claim 1, wherein said power output part has an annular channel that in cross-section is essentially U-shaped, wherein said annular air exit gap is formed at said annular channel, and wherein said motor housing has a housing rim that projects into said annular channel.

6. The power tool according to claim 5, wherein said at least one guide vane is arranged in said annular channel and wherein a spacing between said housing rim and said at least one guide vane is approximately 0.5 mm to 2 mm.

7. The power tool according to claim 5, comprising a cutting head and a disk fixedly connected to said cutting head, wherein said tool member is supported on said cutting head and wherein said annular channel is formed on said disk.

8. The power tool according to claim 1, wherein said motor is an electronically commutated brushless motor and comprises an electronic control unit, wherein said motor and said electronic control unit are arranged in said motor housing.

9. The power tool according to claim 8, comprising rotatingly driven fan blades arranged in said motor housing and sucking in the cooling air into said motor housing through said guide shaft that is hollow.

10. The power tool according to claim 9, wherein said motor is an external rotor motor with an external rotor, wherein at least one of said fan blades is arranged on said external rotor.

11. The power tool according to claim 9, wherein said motor housing is divided by a wall into a pressure side and into a suction side, wherein said fan blades are arranged within said pressure side and said electronic control unit is arranged within said suction side.

12. The power tool according claim 8, comprising a battery housing arranged at said first end of said guide shaft, wherein said battery housing has a receiving opening for said battery, wherein the cooling air is sucked into the guide shaft through a gap that is formed at said receiving opening between said battery and said battery housing.

13. A hand-held power tool comprising:
   at least one tool member;
   a motor drivingly connected to said tool member;
   a motor housing in which said motor is arranged;
   a battery for driving said tool member;
   a guide shaft having a first end and an opposed second end;
   wherein on said first end said battery is arranged and on said second end said motor housing and said tool member are arranged;
   wherein said motor is elastically supported such that said motor is able to tilt in said motor housing when transverse loads, caused by external transverse forces acting on the tool member, act on said motor.

14. The power tool according to claim 13, wherein said motor comprises a fastening flange that is inserted and secured between housing ribs of said motor housing.

15. The power tool according to claim 13, wherein said motor comprises a motor shaft that is supported by a first bearing and a second bearing, wherein said first bearing is arranged on an end of said motor shaft that is facing away from said tool member and said second bearing is arranged in a central area of said motor shaft.

16. The power tool according to claim 15, wherein said motor has a rotating power output part that, when loaded transverse to a longitudinal direction of said motor shaft, is supported on a housing rim of said motor housing.

17. The power tool according to claim 16, wherein said housing rim delimits an air exit gap for cooling air that is formed between the power output part of said motor and said motor housing.

* * * * *